(12) United States Patent
Mizumaki

(10) Patent No.: US 7,164,215 B2
(45) Date of Patent: Jan. 16, 2007

(54) MOTOR

(75) Inventor: Masao Mizumaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/771,600

(22) Filed: Feb. 4, 2004

(65) Prior Publication Data
US 2004/0212274 A1 Oct. 28, 2004

(30) Foreign Application Priority Data
Feb. 7, 2003 (JP) .............................. 2003-030365

(51) Int. Cl.
*H02K 37/00* (2006.01)
(52) U.S. Cl. ...................... 310/49 R; 310/254; 310/261
(58) Field of Classification Search .............. 310/49 R, 310/89, 201, 208, 179, 156.01, 42, 44, 216, 310/254
See application file for complete search history.

(56) References Cited

U.S. PATENT DOCUMENTS

| 5,384,506 | A | * | 1/1995 | Aoshima | ................... 310/49 R |
| 5,757,108 | A | * | 5/1998 | Suzuki | ...................... 310/49 R |
| 5,780,944 | A | * | 7/1998 | Sakamoto | ................. 310/49 R |
| 5,854,526 | A | | 12/1998 | Sakamoto | |
| 6,043,574 | A | | 3/2000 | Prudham | |

2002/0190594 A1 12/2002 Numaya

FOREIGN PATENT DOCUMENTS

| JP | 51-079221 | 7/1976 |
| JP | 07/046814 | 2/1995 |

* cited by examiner

*Primary Examiner*—Thanh Lam
(74) *Attorney, Agent, or Firm*—Cowan, Liebowitz & Latman, P.C.

(57) ABSTRACT

A motor includes a rotor shaft 7 which is fixed in the inside diameter portion of a magnet 6, a first coil 2 which is arranged adjacently to the magnet in the axial direction of the rotor shaft, a first outside magnetic pole portion 1a which is excited by the first coil, is inserted on the inner periphery side of the first coil, and is arranged so as to be opposed to a predetermined angle range of the outer peripheral surface of the magnet with a predetermined gap being provided between the first outside magnetic pole portion and the outer peripheral surface of the magnet, a second coil 4 which is arranged on almost the same plane as the first coil so as to be adjacent to the magnet in the axial direction of the rotor shaft, and a second outside magnetic pole portion 1b which is excited by the second coil, is inserted on the inner periphery side of the second coil, and is arranged so as to be opposed to a predetermined angle range of the outer peripheral surface of the magnet with a predetermined gap being provided between the second outside magnetic pole portion and the outer peripheral surface of the magnet in a state in which the phase shifts through (180/N) degree with respect to the magnetization portion of the magnet from the first outside magnetic pole portion.

4 Claims, 6 Drawing Sheets

MOTOR

BACKGROUND OF THE INVENTION

1. Field of the Invention

The present invention relates to a cylindrical motor suitable for being formed in a small size.

2. Related Background Art

FIG. 7A is a schematic longitudinal sectional view showing one construction example of a conventional step motor, and FIG. 7B is a partial sectional view schematically showing a state of magnetic flux flowing from a stator of the step motor shown in FIG. 7A.

In FIG. 7A, two bobbins 101, each having a stator coil 105 wound concentrically on the bobbin 101, are arranged in the axial direction, and each of the two bobbins 101 is fixedly held by a separate stator yoke 106. On the inside diameter surface of the stator yoke 106, stator teeth 106a and 106b, which are arranged alternately in the circumferential direction on the inside diameter surface of the bobbin 101, are formed. The stator yoke 106 integral with the stator teeth 106a or 106b is fixed to each of two cases 103. Thus, two stators 102 corresponding to the two stator coils 105 for excitation are formed.

To one of the two cases 103 are fixed a flange 115 and a bearing 108, and to the other thereof is fixed another bearing 108. A rotor 109 consists of a rotor magnet 111 fixed to a rotor shaft 110, and a radial gap is formed between the rotor magnet 111 and the stator yoke 106 of each of the stators 102. The rotor shaft 110 is rotatably supported by the two bearings 108.

In the above-described conventional small step motor, the case 103, the bobbin 101, the stator coil 105, and the stator yoke 106 are arranged concentrically, which presents a problem in that the external dimensions of motor increase. Also, magnetic flux generated by the energization of the stator coil 105 mainly passes through an end face 106a1 of the stator tooth 106a and an end face 106b1 of the stator tooth 106b, which also presents a problem in that the magnetic flux is not applied effectively to the rotor magnet 111, so that the motor output does not increase.

To solve these problems, the applicant of the present invention has proposed a motor having a construction disclosed in Japanese Patent Application Laid-Open No. H9-331666. The motor relating to this proposal is constructed so that a cylindrical permanent magnet is equally divided in the circumferential direction to form a rotor (rotor magnet) in which the magnet is magnetized so as to have different poles alternately, a first coil, the rotor, and a second coil are arranged in that order in the axial direction of the rotor (the axial direction of the motor), a first outside magnetic pole portion and a first inside magnetic pole portion, which are excited by the first coil, are opposed to the outer peripheral surface and the inner peripheral surface on one side in the axial direction of the rotor, and a second outside magnetic pole portion and a second inside magnetic pole portion, which are excited by the second coil, are opposed to the outer peripheral surface and the inner peripheral surface on the other side in the axial direction of the rotor. In this construction, a rotating shaft, which is a rotor shaft, is taken-out of the cylindrical permanent magnet (magnet).

According to the motor having such a construction, the output can be increased, and also the external dimensions of motor can be made small. Further, by making the magnet thin, the distance between the first outside magnetic pole portion and the first inside magnetic pole portion and the distance between the second outside magnetic pole portion and the second inside magnetic pole portion can be shortened, by which the magnetic reluctance of a magnetic circuit can be decreased. Therefore, even if the current flowing in the first and second coils is small, a lot of magnetic flux can be generated, so that a high output can be maintained.

FIG. 8 is a schematic longitudinal sectional view of the motor having the above-described construction.

In FIG. 8, reference numeral 201 denotes the magnet, 202 denotes the first coil, and 203 denotes the second coil. A first stator 204 has the first outside magnetic pole portion 204a, 204b and the first inside magnetic pole portion 204c, 204d. A second stator 205 has the second outside magnetic pole portion 205a, 205b and the second inside magnetic pole portion 205c, 205d. An output shaft 206, to which the magnet 201 is fixed, rotates integrally with the magnet 201. The output shaft 206 is rotatably supported by bearing portions 204e and 205e of the first stator 204 and the second stator 205, respectively. Reference numeral 207 denotes a connecting ring for holding the first stator 204 and the second stator 205.

Also, the applicant of the present invention has proposed an improvement on the above-described motor in Japanese Patent Application Laid-Open No. H10-229670. In this improved motor, an inside magnetic pole is formed into a cylindrical shape, an output shaft inserted in an inside diameter portion of the inside magnetic pole is formed of a soft magnetic material, and a bearing, which is installed on a stator to rotatably hold the output shaft, is formed of a nonmagnetic material.

According to this proposal, the motor output is increased because the output shaft can also be used as a magnetic circuit. Also, the attraction between the stator and the output shaft caused by magnetism is prevented by the nonmagnetic material of the bearing.

However, the motors described in the aforementioned Japanese Patent Application Laid-Open Nos. H9-331666 and H10-229670 have a drawback in that the axial length of motor increases like the conventional step motor shown in FIG. 7A.

Also, for the motors shown in FIGS. 7A and 7B and FIG. 8, the position at which the magnetic flux generated by the energization of the first coil is applied to the magnet and the position at which the magnetic flux generated by the energization of the second coil is applied to the magnet shift from each other in the axial direction of the magnet. Therefore, when the magnet is unevenly magnetized at positions in the direction parallel with the shaft (the position on the side of 204 and the position on the side of 205 in FIG. 8), the accuracy of rotation stop position of the magnet sometimes decreases.

To solve this problem, the applicant of the present invention has proposed a motor described in Japanese Patent Application Laid-Open No. 2001-206302. This motor includes a rotatable rotor having a cylindrical magnet portion which is divided in the circumferential direction so as to be magnetized to different poles alternately; a first outside magnetic pole portion opposed to a first predetermined angle range of the outer peripheral surface of the magnet portion, which is excited by a first coil; a first inside magnetic pole portion opposed to the inner peripheral surface of the magnet portion, which is excited by the first coil; a second outside magnetic pole portion opposed to a second predetermined angle range of the outer peripheral surface of the magnet portion, which is excited by a second coil; and a second inside magnetic pole portion opposed to the inner peripheral surface of the magnet portion, which is excited by the second coil. The first outside magnetic pole portion and the second outside magnetic pole portion are arranged on the same circumference with the magnet portion being the center.

However, in the motor proposed in the aforementioned document, it is necessary to provide a predetermined gap between the inside diameter of magnet and the opposed inside magnetic pole, so that the control of the gap at the time of manufacture increases the manufacturing cost.

Also, regarding the shape of stator as well, the cylindrical inside magnetic pole portion and outside magnetic pole portion are needed, and it is difficult in terms of parts manufacture to integrally fabricate these magnetic pole portions. Further, in the case where after these magnetic pole portions are manufactured separately, they are assembled to each other, the number of parts increases, which leads to an increase in cost.

SUMMARY OF THE INVENTION

The present invention has been made to solve the above problems, and accordingly an object thereof is to provide a low-cost and high-output motor having a small size and a short axial length.

To achieve the above object, a motor in accordance with one embodiment of the present invention includes a cylindrical magnet which is divided into N in the circumferential direction so as to be magnetized to different poles alternately; a rotor shaft formed of a soft magnetic material, which is fixed in the inside diameter portion of the magnet; a first coil arranged adjacently to the magnet in the axial direction of the rotor shaft; a first outside magnetic pole portion which is excited by the first coil, is inserted on the inner periphery side of the first coil, and is arranged so as to be opposed to a predetermined angle range of the outer peripheral surface of the magnet with a predetermined gap being provided between the first outside magnetic pole portion and the outer peripheral surface of the magnet; a second coil arranged on almost the same plane as the first coil so as to be adjacent to the magnet in the axial direction of the rotor shaft; and a second outside magnetic pole portion which is excited by the second coil, is inserted on the inner periphery side of the second coil, and is arranged so as to be opposed to a predetermined angle range of the outer peripheral surface of the magnet with a predetermined gap being provided between the second outside magnetic pole portion and the outer peripheral surface of the magnet in a state in which the phase shifts through (180/N) degree with respect to the magnetization portion of the magnet from the first outside magnetic pole portion.

Other objects and features of the present invention will become more apparent in the detailed description and drawings which follow.

DESCRIPTION OF THE PREFERRED EMBODIMENTS

One embodiment of the present invention will now be described.

Figure 1:
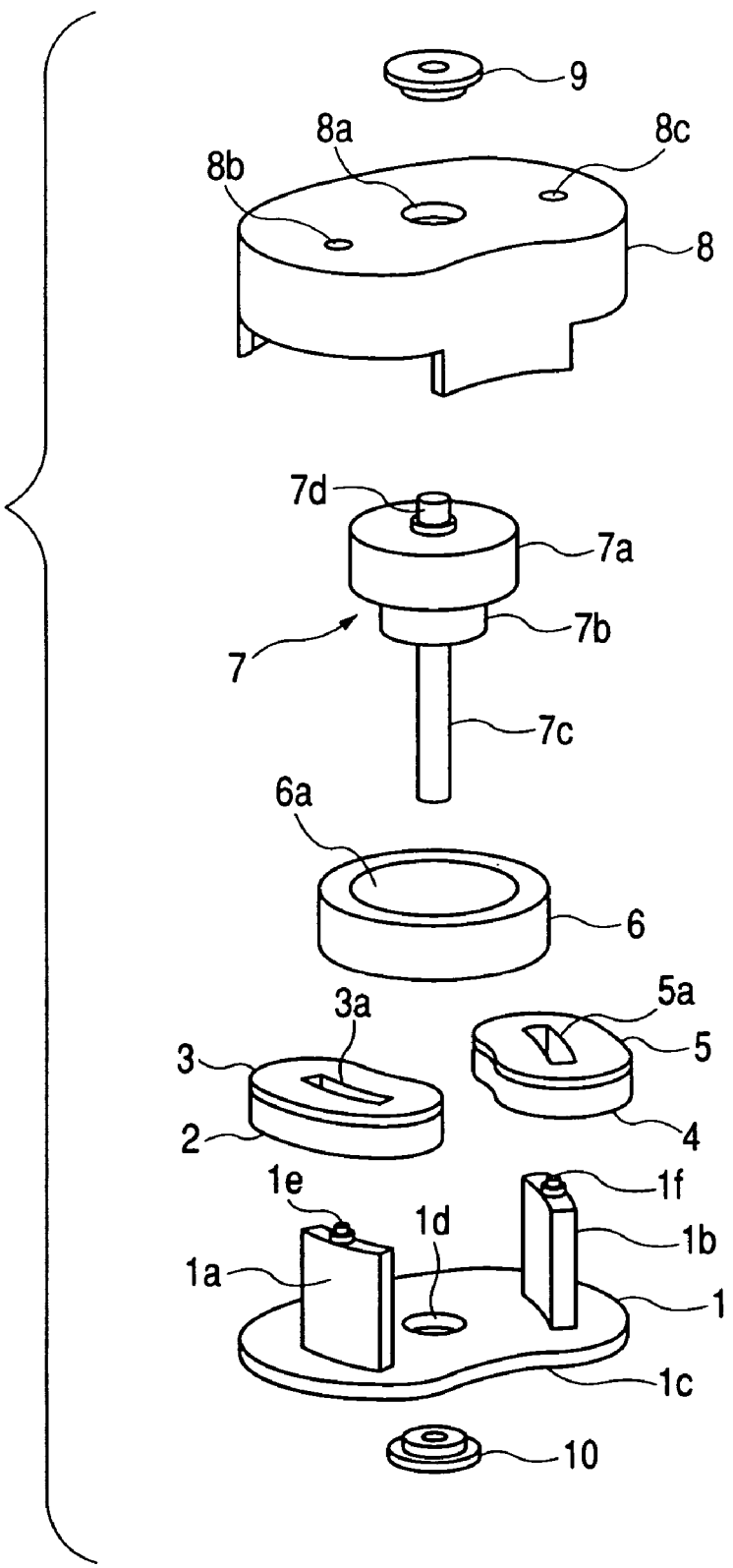
FIG. 1 is an exploded perspective view of a motor in accordance with one embodiment of the present invention.
Figure 2:
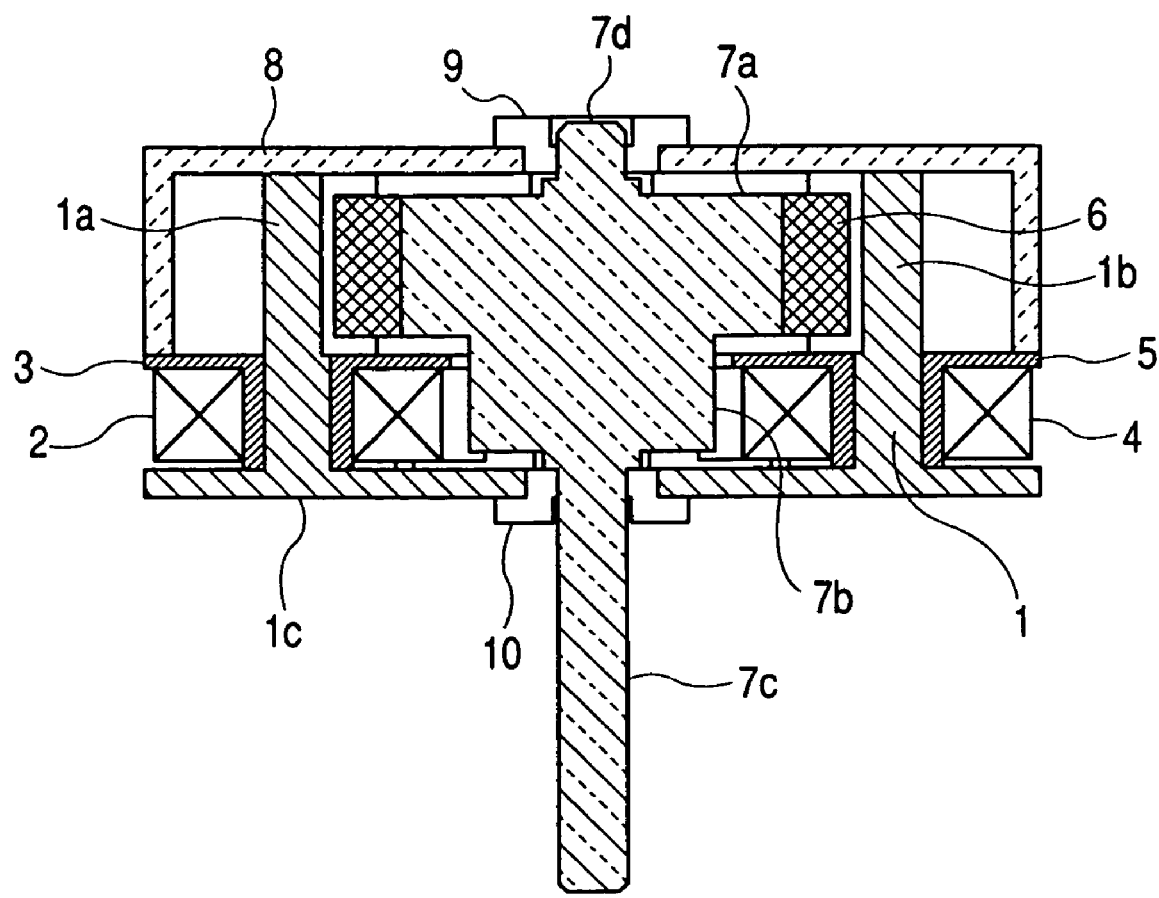
FIG. 2 is a sectional view on a plane parallel with the rotor shaft direction of the motor shown in FIG. 1.

FIGS. 1 and 2 are views showing a motor in accordance with one embodiment of the present invention. FIG. 1 is an exploded perspective view of the motor, and FIG. 2 is a sectional view on a plane which passes through a coil and a rotor shaft and is parallel with the rotor shaft direction.

In FIGS. 1 and 2, reference numeral 1 denotes a stator formed of a soft magnetic material. The stator 1 has a first outside magnetic pole portion 1a, a second outside magnetic pole portion 1b, a flat plate portion 1c connecting one end of the first outside magnetic pole portion 1a and one end of the second outside magnetic pole portion 1b to each other, and a bearing mounting portion 1d to which a bearing 10, described later, is mounted. The first outside magnetic pole portion 1a and the second outside magnetic pole portion 1b are formed into a comb teeth shape extending in the direction parallel with a rotor shaft 7, described later.

For the stator 1 in this embodiment, unlike the stator described in Japanese Patent Application Laid-Open No. H9-331666, the first outside magnetic pole portion 1a and the second outside magnetic pole portion 1b are formed integrally as shown in FIGS. 1 and 2. Therefore, a mutual error between the first outside magnetic pole portion 1a and the second outside magnetic pole portion 1b is reduced, and hence variations in motor performance caused by assembly can be kept to a minimum.

Reference numeral 2 denotes a first coil formed by winding a conductive wire, and 3 denotes a first bobbin on which the first coil 2 is wound. The first coil 2 is fixed so that the first outside magnetic pole portion 1a is arranged at the inner periphery thereof in a state of being fixed to the first bobbin 3. By energizing the first coil 2, the first outside magnetic pole portion 1a is excited. Reference numeral 4 denotes a second coil formed by winding a conductive wire, and 5 denotes a second bobbin on which the second coil 4 is wound. The second coil 4 is fixed so that the second outside magnetic pole portion 1b is arranged at the inner periphery thereof in a state of being fixed to the second bobbin 5. By energizing the second coil 4, the second outside magnetic pole portion 1b is excited.

The first coil 2 and the second coil 4 are arranged adjacently on the flat surface of the flat plate portion 1c of the stator 1, so that the length in the axial direction of the motor can be shortened.

Reference numeral 6 denotes a cylindrical magnet (a magnet ring including a thin annular shape) formed of a permanent magnet. The outer peripheral surface of the magnet 6 is divided into multiple portions in the circumferential direction so that the number of magnetization poles is N (in this embodiment, divided into six portions, i.e., N=6), the magnet being magnetized so as to have the S pole and the N pole alternately. This magnet 6 is formed of a plastic magnet material molded by injection molding etc., by which the thickness in the radial direction of the cylindrical shape can be made very small. Also, the inner peripheral surface of the magnet 6 has weaker magnetization distribution than the outer peripheral surface thereof or is not at all be magnetized, or it is magnetized so as to have a pole reverse to the pole of the outer peripheral surface, that is, when the outer peripheral surface has the S pole, the inner peripheral surface in this range is magnetized so as to have the N pole.

The rotor shaft 7 is formed of a soft magnetic material, and the first columnar portion 7a thereof is adherently fixed to an inner peripheral surface 6a of the magnet 6 by bonding, press fitting, or other means. At this time, the rotor shaft 7 is fixed to the magnet 6 so that one end in the axial direction of the magnet 6 is flush with the top surface of the first columnar portion 7a (see FIG. 2). The rotor shaft 7 is formed with an output shaft portion 7c and a holding shaft portion 7d so as to be held rotatably by bearings 9 and 10, described later. At this time, a second columnar portion 7b of the rotor shaft 7 is arranged adjacently between the first coil 2 and the second coil 4 as shown in FIG. 2.

The first outside magnetic pole portion 1a and the second outside magnetic pole portion 1b are arranged so as to be opposed to the outer peripheral surface of the magnet 6 with a predetermined gap being provided therebetween. A first inside magnetic pole portion is formed by the portion in which the first columnar portion 7a is opposed to the first outside magnetic pole portion 1a and the portion in which the second columnar portion 7b is adjacent to the outer periphery of the first coil 2. Similarly, a second inside magnetic pole portion is formed by the portion in which the first columnar portion 7a is opposed to the second outside magnetic pole portion 1b and the portion in which the second columnar portion 7b is adjacent to the outer periphery of the second coil 4.

By energizing the first coil 2, the first outside magnetic pole portion 1a and the first inside magnetic pole portion are excited, so that magnetic flux crossing the magnet 6 is generated between the magnetic poles and is applied effectively to the magnet 6. At this time, the first outside magnetic pole portion 1a and the first inside magnetic pole portion are excited so as to have poles opposite to each other. Similarly, by energizing the second coil 4, the second outside magnetic pole portion 1b and the second inside magnetic pole portion are excited, so that magnetic flux crossing the magnet 6 is generated between the magnetic poles and is applied effectively to the magnet 6. At this time, the second outside magnetic pole portion 1b and the second inside magnetic pole portion are excited so as to have poles opposite to each other.

Since the magnet 6 is formed of a cylindrical plastic magnet material molded by injection molding or other means as described above, the thickness in the radial direction of the cylindrical shape can be made very small, and also there is no need for providing a gap between the first columnar portion 7a constituting the inside magnetic pole portion so as to be opposed to the inner peripheral surface of the magnet 6 and the inner peripheral surface of the magnet 6. Therefore, the distance between the first outside magnetic pole portion 1a and the first columnar portion 7a and the distance between the second outside magnetic pole portion 1b and the first columnar portion 7a can be made very small. As a result, the magnetic reluctance of the magnetic circuit formed by the first coil 2, the first outside magnetic pole portion 1a, and the first inside magnetic pole portion and the magnetic circuit formed by the second coil 4, the second outside magnetic pole portion 1b, and the second inside magnetic pole portion can be decreased, by which the motor output can be increased.

Also, since the inside diameter portion of the magnet 6 is filled with the rotor shaft 7 as shown in FIG. 2, the mechanical strength of magnet is higher than the motor proposed in Japanese Patent Application Laid-Open No. H9-331666. Also, since the rotor shaft 7 acts as what is called a back metal, which decreases the magnetic reluctance between the S pole and the N pole appearing in the inside diameter portion of the magnet 6, the permeance coefficient of magnetic circuit is set so as to be high, so that even if the motor is used in a high-temperature environment, magnetic deterioration due to demagnetization is little.

For the motor proposed in Japanese Patent Application Laid-Open No. H9-331666, it is necessary to assemble the motor while the gap between the outside diameter portion of magnet and the outside magnetic pole portion is kept with high accuracy, and additionally it is necessary to dispose the inside magnetic pole portion located at a position opposed to the inside diameter portion of magnet with a predetermined gap being provided between the inside magnetic pole portion and the magnet. Therefore, when the accuracies of parts vary or the assembling accuracy is poor, these gaps cannot be kept, and hence there is a high possibility that the inside magnetic pole portion comes into contact with the magnet. On the other hand, in this embodiment, the gap only on the outside diameter portion side of the magnet 6 has only to be controlled, so that the assembly is easy.

Also, in Japanese Patent Application Laid-Open No. H9-331666, the inside magnetic pole portion must be constructed so as not to come into contact with the portion which connects the magnet and the output shaft to each other, so that the axial length of the portion in which the inside magnetic pole portion is opposed to the magnet cannot be increased sufficiently. On the other hand, in this embodiment, since the output shaft also serves as the inside magnetic pole portion, the axial length of the portion in which the inside magnetic pole portion is opposed to the magnet 6 can be made sufficiently long. Therefore, the first outside magnetic pole portion 1a and the second outside magnetic pole portion 1b and the magnet 6 can be used effectively, whereby the motor output can be increased.

Since the first outside magnetic pole portion 1a and the second outside magnetic pole portion 1b are constructed into a comb teeth shape extending in the direction parallel with the motor shaft, the outmost diameter (see L1 in FIG. 3, described later) of motor can be kept to a minimum. For example, if the outside magnetic pole portion is formed by a yoke plate extending in the radial direction of magnet, the magnet must be developed in the planar mode and the coil is wound toward the radial direction, so that the outmost diameter of motor increases though the axial length is short. Contrarily, the outmost diameter (L1) of the motor of this embodiment is determined by the thicknesses of the first outside magnetic pole portion 1a and the second outside magnetic pole portion 1b and the winding widths of the first coil 2 and the second coil 4.

Also, since the first outside magnetic pole portion 1a and the second outside magnetic pole portion 1b have a comb teeth shape extending in the direction parallel with the motor shaft, all of the first coil 2, the second coil 4, and the rotor consisting of the magnet 6 and the rotor shaft 7 can be assembled from one direction (from the upper direction to the lower direction in FIG. 1), so that the assembling workability is high.

Reference numeral 8 denotes a cover. The cover 8 is positioned by fitting an engagement hole 8$b$ on a protrusion 1$e$ provided at the tip end of the first outside magnetic pole portion 1$a$ of the stator 1 and fitting an engagement hole 8$c$ on a protrusion 1$f$ provided at the tip end of the second outside magnetic pole portion 1$b$, and is fixed to the stator 1 in a state in which the tip ends of the first outside magnetic pole portion 1$a$ and the second outside magnetic pole portion 1$b$ are in contact with the back surface of the cover 8. The bearing 9 is fixed to a bearing mounting portion 8$a$ of the cover 8 by staking, bonding, or other means, and the holding shaft portion 7$d$ of the rotor shaft 7 is fitted in the bearing 9, by which the rotor shaft 7 is rotatably held.

The bearing 9 and the bearing 10, which is fixed to the bearing mounting portion 1$d$ of the stator 1 by staking, bonding, or other means, rotatably fit and hold the rotor shaft 7 in the state in which the cover 8 is fixed to the stator 1, and regulate the axial movement of the rotor shaft 7 so as to be within a predetermined range. In this state, as shown in FIG. 2, the magnet 6 fixed to the rotor shaft 7 is positioned so that a predetermined gap is provided between the outer peripheral surface of the magnet 6 and the first outside magnetic pole portion 1$a$ and the second outside magnetic pole portion 1$b$, a predetermined gap is provided between one end in the axial direction of the magnet 6 and the back surface of the cover 8, and a predetermined gap is provided between the other end in the axial direction of the magnet 6 and the bobbin 3 on which the first coil 2 is wound and the bobbin 4 on which the second coil 4 is wound. Therefore, the magnet 6 is arranged adjacently in the axial direction to the first coil 2 and the second coil 4, and the first coil 2 and the second coil 4 are adjacent to each other on a plane perpendicular to the axial direction, so that a motor having a short axial length can be provided.

Figure 3:
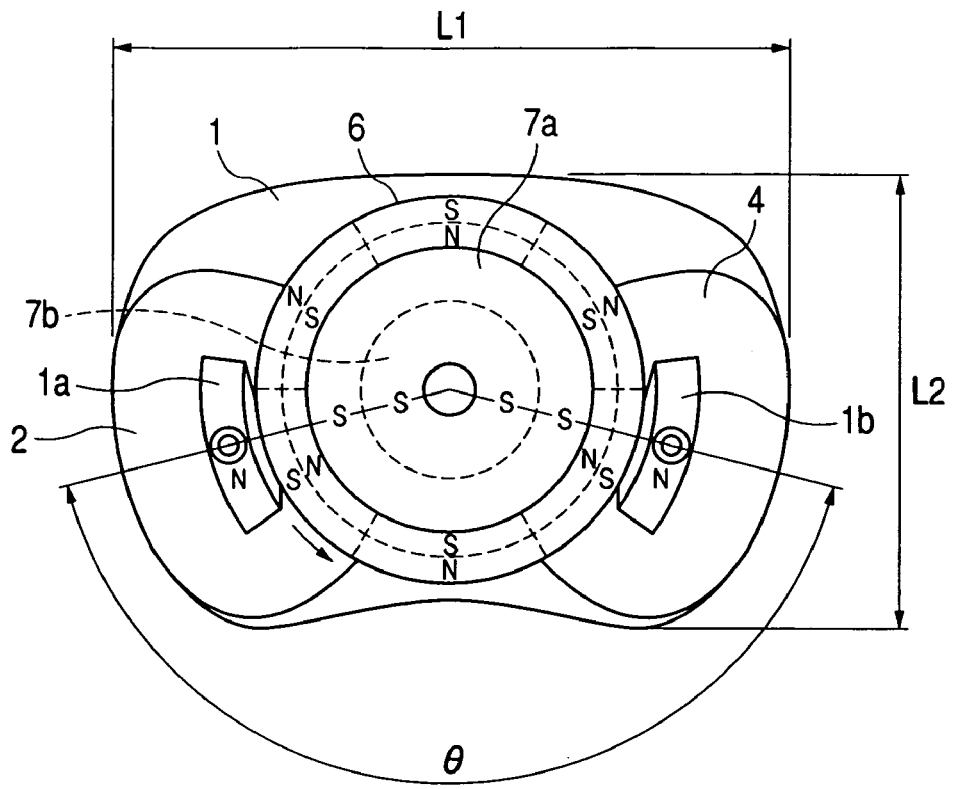
FIG. 3 is a top view showing the positional relationship between a magnet and a stator of the motor shown in FIG. 1.

FIG. 3 is a top view showing the positional relationship between the magnet 6 and the stator 1.

As seen from FIG. 3, for the magnet 6, the outer peripheral surface and the inner peripheral surface thereof are divided evenly into multiple portions in the circumferential direction (in this embodiment, divided into six portions), and magnetized portions in which the S pole and the N pole are magnetized alternately are formed. When the outer peripheral surface has the S pole, the inner peripheral surface has the N pole, and when the outer peripheral surface has the N pole, the inner peripheral surface has the S pole.

Here, the positional relationship between the magnet 6 and the outer magnetic pole portions 1$a$, 1$b$ is explained.

The first outside magnetic pole portion 1$a$ and the second outside magnetic pole portion 1$b$ are arranged at positions at which the phase shifts through an angle of $\theta$ degree when the rotation center of the magnet 6 is considered to be the reference. Here, the angle $\theta$ (degree) is (180 degrees−180 degrees/N) (N=magnetization division number). In this embodiment, since N=6, $\theta$ is 150 degrees. By setting the angle $\theta$ so as to be $\theta$ (degree)=(180 degrees−180 degrees/N) in this manner, the dimension of L2 in FIG. 3 can be set so as to be very small. That is to say, the first outside magnetic pole portion 1$a$ and the second outside magnetic pole portion 1$b$ have only to be arranged so that the phase shifts through (180/N) degree, 30 degrees in this embodiment, with respect to the magnetization phase of the magnet 6. The angle $\theta$ between the first outside magnetic pole portion 1$a$ and the second outside magnetic pole portion 1$b$ with the rotation center of the magnet 6 being the reference is expressed by an equation of (B×360/N−180/N), where B is a positive integer not larger than N. Therefore, the angle $\theta$ between the first outside magnetic pole portion 1$a$ and the second outside magnetic pole portion 1$b$ with the rotation center of the magnet 6 being the reference may be any of 30 degrees, 90 degrees, 150 degrees, 210 degrees, 270 degrees, and 330 degrees. However, in the cases of 30 degrees and 330 degrees, it is difficult to arrange the first coil 2 and the second coil 4. Also, in the case of 90 degrees and 270 degrees, the positions of magnetic force and electromagnetic force of the magnet 6 are imbalanced so that the rotation of the magnet 6 is liable to produce vibrations, or the dimension of L2 cannot be decreased. In order to decrease the dimension of L2, the relationship of B=N/2, i.e., B=3 should be provided, and the angle $\theta$ should be set so as to be (180 degrees−180 degrees/N), i.e., the aforementioned 150 degrees. At this time, the positions of magnetic force and electromagnetic force of the magnet 6 are in a state of being approximately symmetrical in the right-and-left direction, and hence the production of vibrations is kept to a minimum.

Also, it is desirable to set the angle range in which the first outside magnetic pole portion 1$a$ and the second outside magnetic pole portion 1$b$ each are opposed to the outer peripheral surface of the magnet 6 within an angle range of 360 degrees/N (N=magnetization division number). In this embodiment, since N=6, the angle range has only to be set within 60 degrees. Actually, it is set at 45 degrees from the viewpoint of balance between size and torque.

According to the above-described configuration, the first outside magnetic pole portion 1$a$ and the second outside magnetic pole portion 1$b$ are formed so as to be opposed to each other within a predetermined angle range (45 degrees in this embodiment) at positions at which the phase shifts through $\theta$ (=180 degrees−180 degrees/N) on the same plane in the direction perpendicular to the axial direction with respect to the same magnet 6. Therefore, although the conventional motor has a drawback in that the axial length of motor increases because the magnetic pole portions are arranged at the positions shifting in the axial direction so that the phase is shifted (that is, they are not opposed to the same surface of magnet), in this embodiment, the magnet 6 can be made short in the axial direction, and hence a motor having a short length in the direction parallel with the axial direction can be provided.

When attention is paid to a part of the outer peripheral surface of the magnet 6 as the feature of the above-described configuration, by the rotation of the magnet 6, the magnetic flux of the first outside magnetic pole portion 1$a$ excited by the first coil 2 and the magnetic flux of the second outside magnetic pole portion 1$b$ excited by the second coil 4 are applied alternately to that part of the magnet 6. Since these outside magnetic pole portions apply magnetic flux to the same location of the magnet 6, the magnet 6 is not adversely affected by the variations in magnetization, so that a motor having steady performance can be provided.

Next, the operation of the step motor in accordance with one embodiment of the present invention will be described with reference to FIGS. 3 to 6.

FIG. 3 shows a state of motor in which the first outside magnetic pole portion 1$a$ is excited so as to have the N pole and the first inside magnetic pole portion (portion in which the first columnar portion 7$a$ and the second columnar portion 7$b$ are opposed to the first outside magnetic pole portion 1$a$) is excited so as to have the S pole by energizing the first coil 2, and the second outside magnetic pole portion 1$b$ is excited so as to have the N pole and the second inside magnetic pole portion (portion in which the first columnar portion 7a and the second columnar portion 7b are opposed to the second outside magnetic pole portion 1b) is excited so as to have the S pole by energizing the second coil 4.

Figure 4:
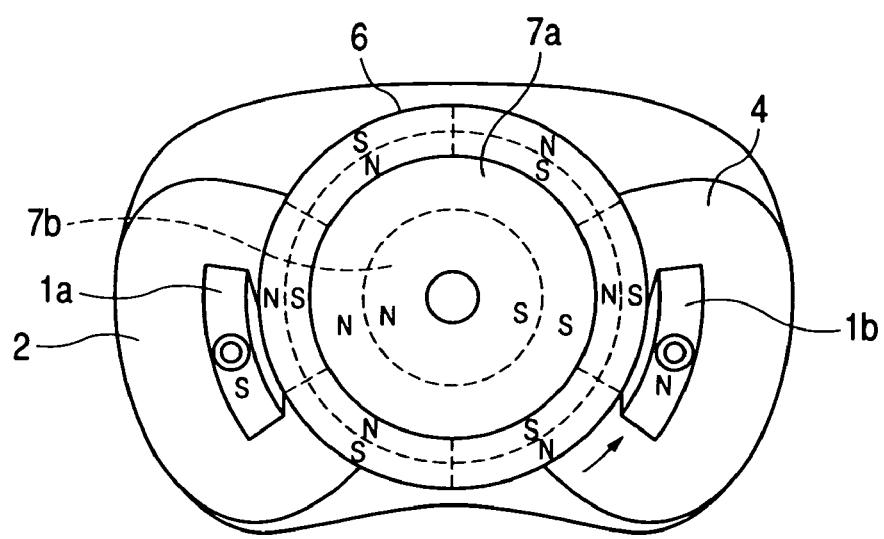
FIG. 4 is a top view showing a state in which a magnet is turned through 30 degrees by switching coil energization from the state shown in FIG. 3.

When the first outside magnetic pole portion 1a is excited so as to have the S pole and the first inside magnetic pole portion is excited so as to have the N pole by reversing only the energization direction of the first coil 2 from the state shown in FIG. 3, the magnet 6 turns 30 degrees in the counterclockwise direction as shown in FIG. 4.

Figure 5:
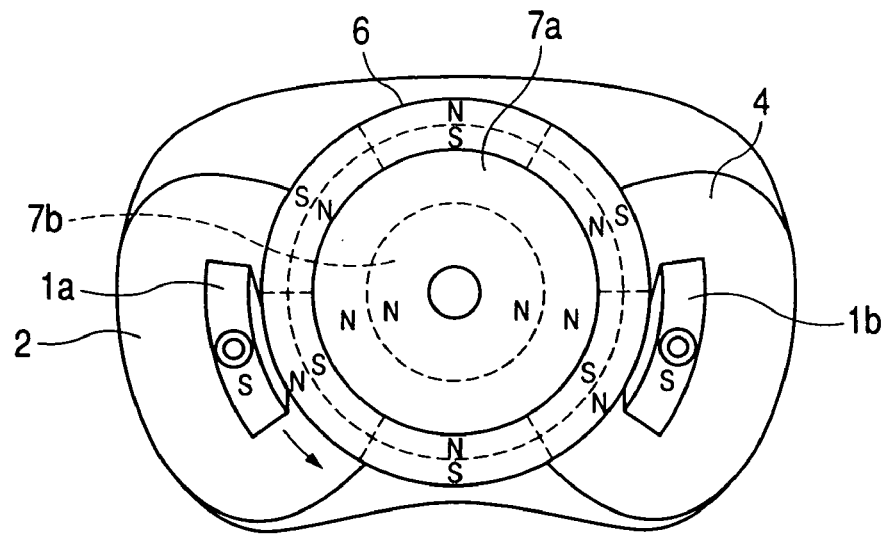
FIG. 5 is a top view showing a state in which a magnet is turned through an additional 30 degrees by switching coil energization from the state shown in FIG. 3.

Next, when the second outside magnetic pole portion 1b is excited so as to have the S pole and the second inside magnetic pole portion is excited so as to have the N pole by reversing only the energization direction of the second coil 4 from the state shown in FIG. 4, the magnet 6 further turns 30 degrees in the counterclockwise direction as shown in FIG. 5.

Figure 6:
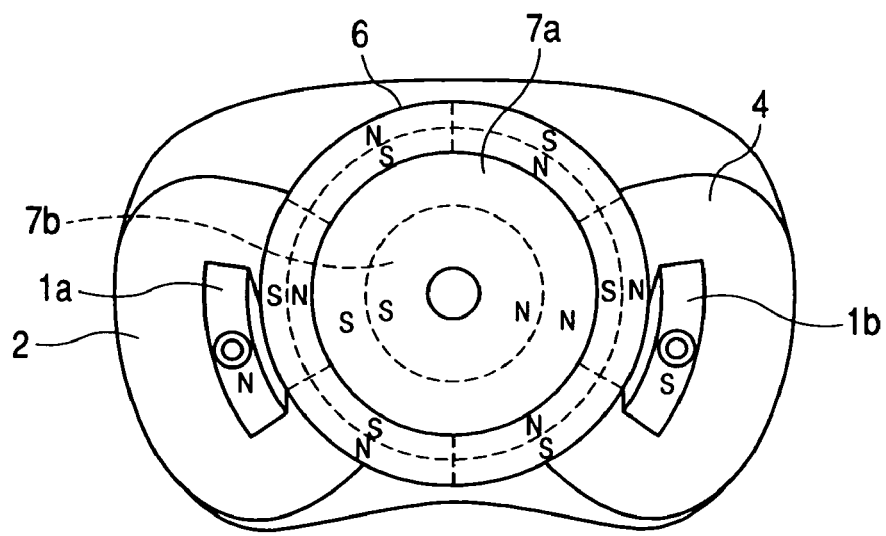
FIG. 6 is a top view showing a state in which a magnet is turned through an additional 30 degrees by switching coil energization from the state shown in FIG. 3.
Figure 7A:
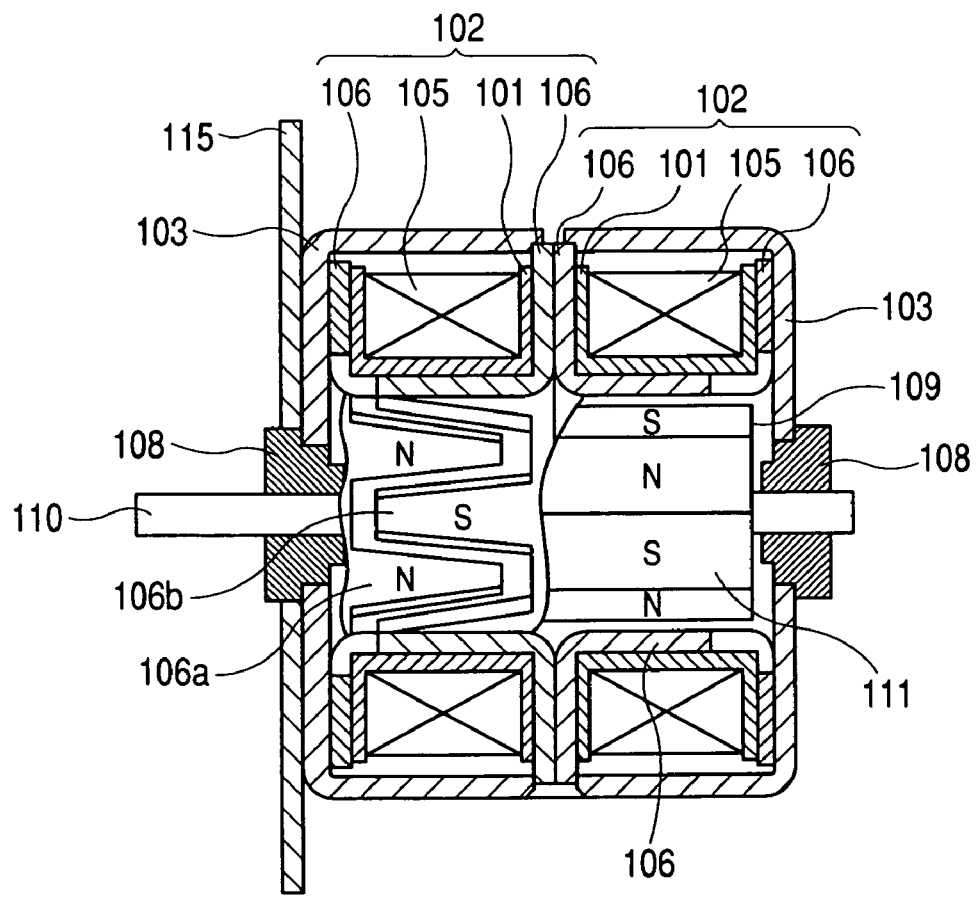
FIG. 7A is a schematic longitudinal sectional view showing one construction example of a conventional step motor.
Figure 7B:
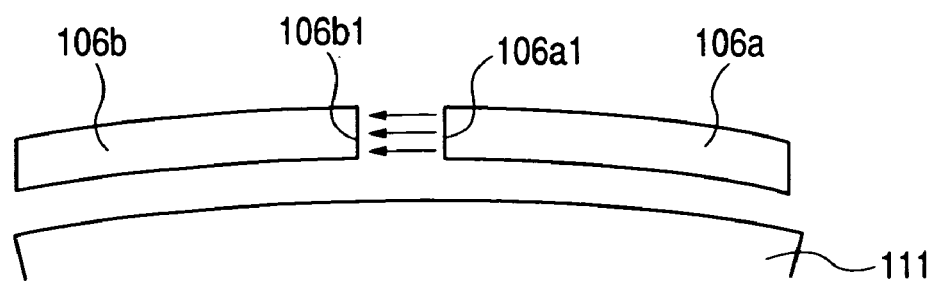
FIG. 7B is a partial sectional view showing magnetic flux generated by energization in the step motor shown in FIG. 7A.
Figure 8:
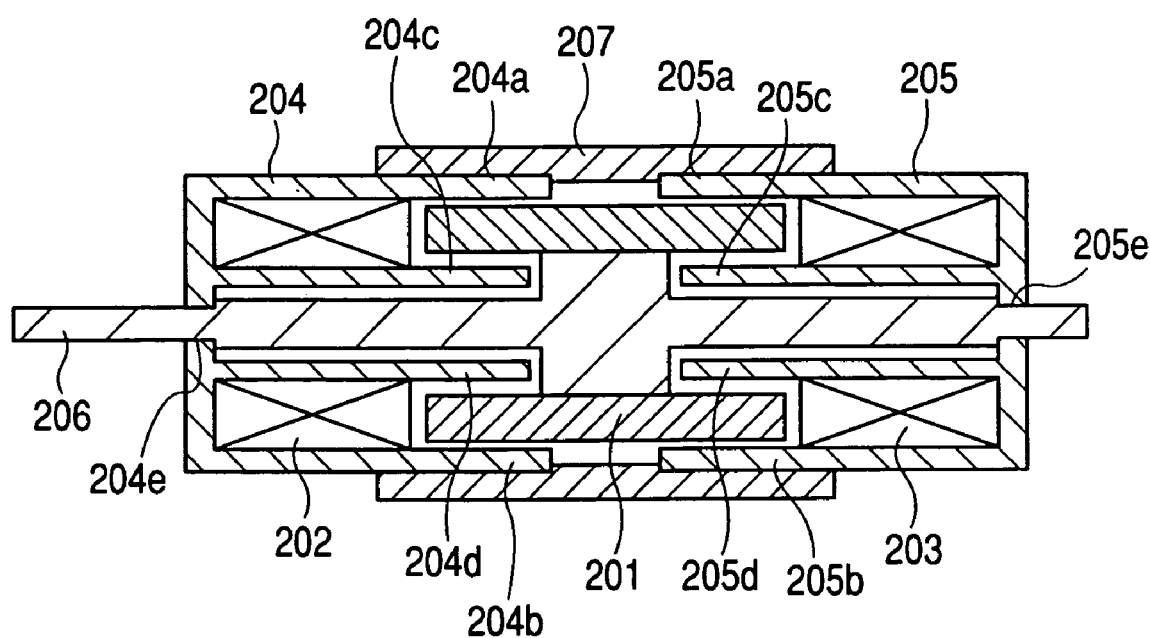
FIG. 8 is a schematic longitudinal sectional view showing another construction example of a conventional cylindrical step motor.

Then, when the first outside magnetic pole portion 1a is excited so as to have the N pole and the first inside magnetic pole portion is excited so as to have the S pole by reversing only the energization direction of the first coil 2 from the state shown in FIG. 5, the magnet 6 further turns 30 degrees in the counterclockwise direction as shown in FIG. 6.

Subsequently, by switching the energization directions of the first coil 2 and the second coil 4 successively as described above, the excitation of the first outside magnetic pole portion 1a and the second outside magnetic pole portion 1b is switched at different timing, and thus the magnet 6 turns to a position corresponding to the energization phase.

In the above-described embodiment, both of the first coil 2 and the second coil 4 are energized in the normal direction as a first energization state, the first coil 2 is energized in the reverse direction and the second coil 4 is energized in the normal direction as a second energization state, both of the first coil 2 and the second coil 4 are energized in the reverse direction as a third energization state, and the first coil 2 is energized in the normal direction and the second coil 4 is energized in the reverse direction as a fourth energization state, and the energization state is switched from the first energization state to the second energization state, the third energization state, and the fourth energization state to turn the magnet 6. However, the operation may be such that both of the first coil 2 and the second coil 4 are energized in the normal direction as a fifth energization state, the first coil 2 is not energized and the second coil 4 is energized in the normal direction as a sixth energization state, the first coil 2 is energized in the reverse direction and the second coil 4 is energized in the normal direction as a seventh energization state, the first coil 2 is energized in the reverse direction and the second coil 4 is not energized as an eighth energization state, and the energization state is switched from the fifth energization state to the sixth energization state, the seventh energization state, and the eighth energization state. By this operation as well, the magnet 6 is turned to a rotation position corresponding to the energization phase.

The following is a description of the positional relationship between the magnet 6 and the first outside magnetic pole portion 1a and the second outside magnetic pole portion 1b.

When the energization state is switched from the first energization state to the second energization state, the third energization state, and the fourth energization state as described above, the polarities of the first outside magnetic pole portion 1a and the second outside magnetic pole portion 1b are switched by alternate excitation.

When the first outside magnetic pole portion 1a is excited so as to have the N pole by the normal energization of the first coil 2, as shown in FIG. 3, a turning force in the clockwise direction in the figure is generated on the magnet 6 so that the center of the first outside magnetic pole portion 1a coincides with the center of the magnetization portion of the magnet 6 (the center of the S pole). At the same time, when the second outside magnetic pole portion 1b is excited so as to have the N pole by the normal energization of the second coil 4, a turning force in the counterclockwise direction in the figure is generated on the magnet 6 so that the center of the second outside magnetic pole portion 1b coincides with the center of the magnetization portion of the magnet 6 (the center of the S pole), and during the energization of both coils, the magnet 6 stands still in a state in which the turning forces are balanced. This state is shown in FIG. 3. When the energization amounts to both coils are equal, both of the phase difference between the center of the first outside magnetic pole portion 1a and the center of the magnetization portion of the magnet 6 (the center of the S pole) and the phase difference between the center of the second outside magnetic pole portion 1b and the center of the magnetization portion of the magnet 6 (the center of the S pole) are about 15 degrees.

When the first coil 2 is switched to the reverse energization from the state shown in FIG. 3, the first outside magnetic pole portion 1a is excited so as to have the S pole, and a turning force in the counterclockwise direction in the figure is generated on the magnet 6 so that the center of the first outside magnetic pole portion 1a coincides with the center of the magnetization portion of the magnet 6 (the center of the N pole). Here, by keeping the second coil 4 in the normal energization state, a turning force in the counterclockwise direction is similarly generated on the magnet 6 so that the center of the second outside magnetic pole portion 1b coincides with the center of the magnetization portion of the magnet 6 (the center of the S pole), so that the magnet 6 begins to turn in the counterclockwise direction from the state shown in FIG. 3.

When the magnet 6 turns about 15 degrees in the counterclockwise direction from the state shown in FIG. 3, a state in which the center of the second outside magnetic pole portion 1b coincides with the center of the magnetization portion of the magnet 6 (the center of the S pole) is established. At this time, the center of the first outside magnetic pole portion 1a is in a state of coinciding with the boundary of magnetization portions of the magnet 6 (boundary between the S pole and the N pole), and a force for further turning the magnet 6 in the counterclockwise direction is generated. When the magnet 6 further turns about 15 degrees in the counterclockwise direction from this state (turns about 30 degrees in the counterclockwise direction from the state shown in FIG. 3), a state in which the turning forces of both coils are balanced is established, so that the magnet 6 stands still at this position. This state is shown in FIG. 4.

When the second coil 4 is switched to the reverse energization from the state shown in FIG. 4, the second outside magnetic pole portion 1b is excited so as to have the S pole, and a turning force in the counterclockwise direction in the figure is generated on the magnet 6 so that the center of the second outside magnetic pole portion 1b coincides with the center of the magnetization portion of the magnet 6 (the center of the N pole). Here, by keeping the first coil 2 in the reverse energization state, a turning force in the counterclockwise direction is similarly generated on the magnet 6 so that the center of the first outside magnetic pole portion 1a coincides with the center of the magnetization portion of the magnet 6 (the center of the N pole), so that the magnet 6 begins to turn in the counterclockwise direction from the state shown in FIG. 4.

When the magnet 6 turns about 15 degrees in the counterclockwise direction from the state shown in FIG. 4, a state in which the center of the first outside magnetic pole portion 1a coincides with the center of the magnetization portion of the magnet 6 (the center of the N pole) is established. At this time, the center of the second outside magnetic pole portion 1b is in a state of coinciding with the boundary of magnetization portions of the magnet 6 (boundary between the S pole and the N pole), and a force for further turning the magnet 6 in the counterclockwise direction is generated. When the magnet 6 further turns about 15 degrees in the counterclockwise direction from this state (turns about 30 degrees in the counterclockwise direction from the state shown in FIG. 4), a state in which the turning forces of both coils are balanced is established, so that the magnet 6 stands still at this position. This state is shown in FIG. 5.

When the first coil 2 is switched to the normal energization from the state shown in FIG. 5, the first outside magnetic pole portion 1a is excited so as to have the N pole, and a turning force in the counterclockwise direction in the figure is generated on the magnet 6 so that the center of the first outside magnetic pole portion 1a coincides with the center of the magnetization portion of the magnet 6 (the center of the S pole). Here, by keeping the second coil 4 in the reverse energization state, a turning force in the counterclockwise direction is similarly generated on the magnet 6 so that the center of the second outside magnetic pole portion 1b coincides with the center of the magnetization portion of the magnet 6 (the center of the N pole), so that the magnet 6 begins to turn in the counterclockwise direction from the state shown in FIG. 5.

When the magnet 6 turns about 15 degrees in the counterclockwise direction from the state shown in FIG. 5, a state in which the center of the second outside magnetic pole portion 1b coincides with the center of the magnetization portion of the magnet 6 (the center of the N pole) is established. At this time, the center of the first outside magnetic pole portion 1a is in a state of coinciding with the boundary of magnetization portions of the magnet 6 (boundary between the S pole and the N pole), and a force for further turning the magnet 6 in the counterclockwise direction is generated. When the magnet 6 further turns about 15 degrees in the counterclockwise direction from this state (turns about 30 degrees in the counterclockwise direction from the state shown in FIG. 5), a state in which the turning forces of both coils are balanced is established, so that the magnet 6 stands still at this position. This state is shown in FIG. 6.

According to the above-described embodiment, the magnetic flux generated by the first coil 2 crosses the magnet 6 located between the first outside magnetic pole portion 1a and the first inside magnetic pole portion, and the magnetic flux generated by the second coil 4 crosses the magnet 6 located between the second outside magnetic pole portion 1b and the second inside magnetic pole portion, so that the magnetic flux can be applied effectively. As a result, the motor output can be increased.

Since the magnet 6 is formed of a cylindrical plastic magnet material molded by injection molding or other means, the thickness in the radial direction of the cylindrical shape can be made very small, and also there is no need for providing a gap between the first columnar portion 7a constituting the inside magnetic pole portion so as to be opposed to the inner peripheral surface of the magnet 6 and the inner peripheral surface of the magnet 6. Therefore, the distance between the first outside magnetic pole portion 1a and the first columnar portion 7a and the distance between the second outside magnetic pole portion 1b and the first columnar portion 7a can be made very small. As a result, the magnetic reluctance of the magnetic circuit formed by the first coil 2, the first outside magnetic pole portion 1a, and the first inside magnetic pole portion and the magnetic circuit formed by the second coil 4, the second outside magnetic pole portion 1b, and the second inside magnetic pole portion can be decreased, by which the motor output can further be increased.

Also, since the inside diameter portion of the magnet 6 is filled with the rotor shaft 7, the mechanical strength of magnet 6 is high. Also, since the rotor shaft 7 acts as a back metal, the magnetic deterioration of the magnet 6 is also little.

In this embodiment, the gap only on the outside diameter portion side of the magnet 6 has only to be controlled, so that the assembly is easy. Also, since the output shaft also serves as the inside magnetic pole portion, the axial length of the portion in which the inside magnetic pole portion is opposed to the magnet 6 can be made sufficiently long. Therefore, the first outside magnetic pole portion 1a and the second outside magnetic pole portion 1b and the magnet 6 can be used effectively, whereby the motor output can be increased.

Also, since the first outside magnetic pole portion 1a and the second outside magnetic pole portion 1b are formed into a comb teeth shape extending in the direction parallel with the rotor shaft 7, the dimension in the direction perpendicular to the shaft of motor can be kept to a minimum, and also the assembly of the first coil 2 and the second coil 4 is easy.

Also, since the first outside magnetic pole portion 1a and the second outside magnetic pole portion 1b are formed so as to be opposed to each other within a predetermined angle range at positions at which the phase shifts through $\theta$ (=180 degrees–180 degrees/N) on the same plane in the direction perpendicular to the axial direction with respect to the same magnet 6, the magnet 6 can be made short in the axial direction, and hence a motor having a short length in the direction parallel with the axial direction can be provided.

Concretely, the configuration is such that the magnetic flux generated in the magnetic circuit formed by the first coil 2 and the first outside magnetic pole portion 1a and the first inside magnetic pole portion and the magnetic flux generated in the magnetic circuit formed by the second coil 4 and the second outside magnetic pole portion 1b and the second inside magnetic pole portion are applied to the same magnet 6. Due to the rotation of the magnet 6, the magnetic circuit acts on the same circumference of the magnet 6, and hence the same location of the magnet 6 is used. Since the same location of the magnet 6 is used in this manner, the magnet 6 is not adversely affected by the variations in magnetization, so that a motor having steady performance can be provided.

Further, if the first outside magnetic pole portion 1a and the second outside magnetic pole portion 1b are formed by the same member, the error of mutual position can be kept small, and the number of parts can be reduced. Therefore, the construction of the motor can be made simple, and the cost can be reduced.

Also, when the number of magnetization poles on the outer peripheral surface of the magnet 6 is taken as N, the first outside magnetic pole portion 1a is formed so that the phase shifts through (180/N) degree with respect to the second outside magnetic pole portion 1b. Therefore, by changing the direction of energization of the first coil 2 and the second coil 4 at different timing, the magnet 6 can be turned to a position corresponding to the energization state, so that the motor can be used as a step motor capable of being rotated bidirectionally.

Next, the correspondence between the present invention and the embodiment will be described.

In the above-described embodiment, the magnet 6 in FIGS. 1 to 6 corresponds to a magnet of the present invention, the rotor shaft 7 in FIGS. 1 to 6 corresponds to a rotor shaft of the present invention, the first coil 2 in FIGS. 1 to 6 corresponds to a first coil of the present invention, the first outside magnetic pole portion 1*a* in FIGS. 1 to 6 corresponds to a first outside magnetic pole portion of the present invention, the second coil 4 in FIGS. 1 to 6 corresponds to a second coil of the present invention, and the second outside magnetic pole portion 1*b* in FIGS. 1 to 6 corresponds to a second outside magnetic pole portion of the present invention. Also, a predetermined angle range of the present invention corresponds to 360 degrees/N (N=magnetization division number).

The above is the correspondence between the element of the embodiment and the element of the present invention, but the present invention is not limited to the embodiment. It is a matter of course that any element which can perform the function described in claims or provided by the embodiment can be used.

What is claimed is:

1. A motor comprising:
  a magnet which has a cylindrical shape and is divided into N in the circumferential direction so as to be magnetized to different poles alternately;
  a rotor shaft which is formed of a soft magnetic material and is fixed in the inside diameter portion of said magnet;
  a first coil which is adjacent to the rotor shaft and is arranged adjacently to said magnet in the axial direction of said rotor shaft;
  a first outside magnetic pole portion which is excited by said first coil, is inserted on the inner periphery side of said first coil, and is arranged so as to be opposed to a predetermined angle range of the outer peripheral surface of said magnet with a predetermined gap being provided between said first outside magnetic pole portion and the outer peripheral surface of said magnet;
  a second coil which is adjacent to the rotor shaft and is arranged on almost the same plane as said first coil so as to be adjacent to said magnet in the axial direction of said rotor shaft;
  a second outside magnetic pole portion which is excited by said second coil, is inserted on the inner periphery side of said second coil, and is arranged so as to be opposed to a predetermined angle range of the outer peripheral surface of said magnet with a predetermined gap being provided between said second outside magnetic pole portion and the outer peripheral surface of said magnet,
  said rotor shaft comprises a first inside magnetic pole portion which is energized by the first coil and a second inside magnetic pole portion which is energized by the second coil; and
  wherein an angle $\theta$ between said first outside magnetic pole portion and said second outside magnetic pole portion with the rotation center of said rotor shaft being the reference is $\theta = (180 - 180/N)$ degrees.

2. The motor according to claim 1, wherein said first outside magnetic pole portion and said second outside magnetic pole portion are formed of a same member.

3. The motor according to claim 1, wherein said first outside magnetic pole portion and said second outside magnetic pole portion are formed into a comb teeth shape extending in the axial direction of said rotor shaft and in the same direction.

4. The motor according to claim 1, wherein the excitation of said first coil and said second coil is switched at different timing.

* * * * *